(12) United States Patent
Lang

(10) Patent No.: US 7,322,616 B2
(45) Date of Patent: Jan. 29, 2008

(54) TUBING CONNECTING DEVICE

(75) Inventor: Mark T Lang, Collierville, TN (US)

(73) Assignee: Mueller Gas Products, Hartsville, TN (US)

( * ) Notice: Subject to any disclaimer, the term of this patent is extended or adjusted under 35 U.S.C. 154(b) by 296 days.

(21) Appl. No.: 11/031,713

(22) Filed: Jan. 7, 2005

(65) Prior Publication Data

US 2006/0151996 A1    Jul. 13, 2006

(51) Int. Cl.
F16K 1/00    (2006.01)

(52) U.S. Cl. .................. 285/197; 285/192; 285/198; 285/122.1; 137/343; 137/883

(58) Field of Classification Search ............. 285/192, 285/194, 195, 197, 198, 218, 199, 122.1, 285/124.1, 124.2, 124.3, 124.4; 137/834, 137/883, 342, 343, 543, 614.12; 126/39 N
See application file for complete search history.

(56) References Cited

U.S. PATENT DOCUMENTS

| 887,051 A * | 5/1908 | Wiest ..................... 285/197 |
| 3,870,348 A | 3/1975 | Hawkins |
| 3,872,888 A | 3/1975 | Porter |
| 4,108,480 A | 8/1978 | Ettema |
| 4,418,746 A | 12/1983 | Langenhorst et al. |
| 5,169,177 A | 12/1992 | McLennan et al. |
| 5,199,749 A * | 4/1993 | Corcoran ................ 285/197 |
| 5,694,972 A | 12/1997 | King |
| 5,906,048 A * | 5/1999 | Bender .................. 29/890.14 |
| 5,979,430 A | 11/1999 | Peed et al. |
| 6,722,356 B2 | 4/2004 | Distaso |
| 6,767,033 B2 | 7/2004 | King, Jr. et al. |
| 6,773,036 B1 | 8/2004 | King |
| 2003/0030275 A1 | 2/2003 | Nicolini et al. |
| 2004/0080158 A1 | 4/2004 | King, Jr. et al. |
| 2004/0207199 A1 | 10/2004 | Greco |

* cited by examiner

Primary Examiner—David Bochna
(74) Attorney, Agent, or Firm—Harness, Dickey & Pierce, P.L.C.

(57) ABSTRACT

A tubing connecting device for a fluid carrying tube having a flat portion with an aperture therethrough includes a coupling body having a first port and a second port that are in fluid communication, a planar surface on the coupling body, surrounding the first port and configured to engage the flat portion of the tube with the first port in fluid communication with the aperture. A strap is affixed at both ends to the coupling body and is configured to engage the tube and hold the coupling body in place on the flat.

27 Claims, 6 Drawing Sheets

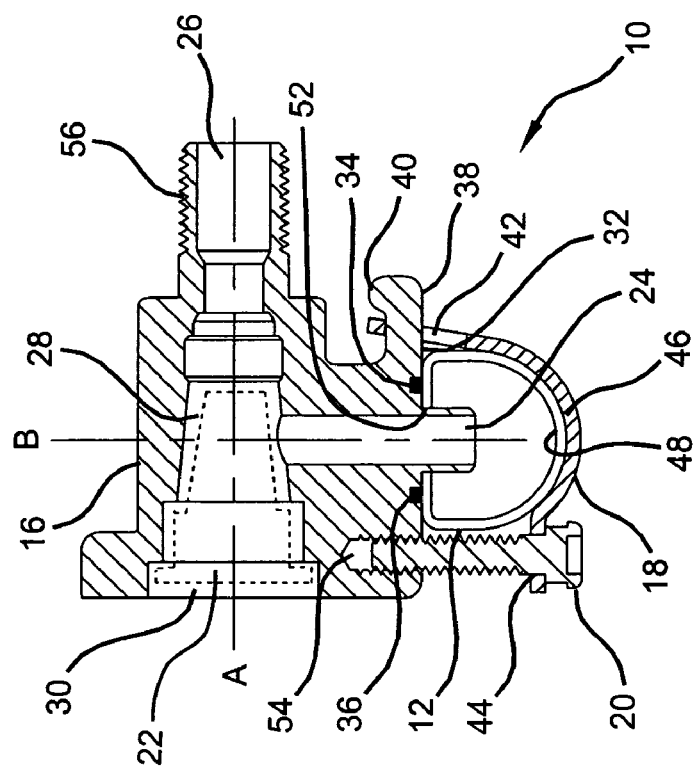
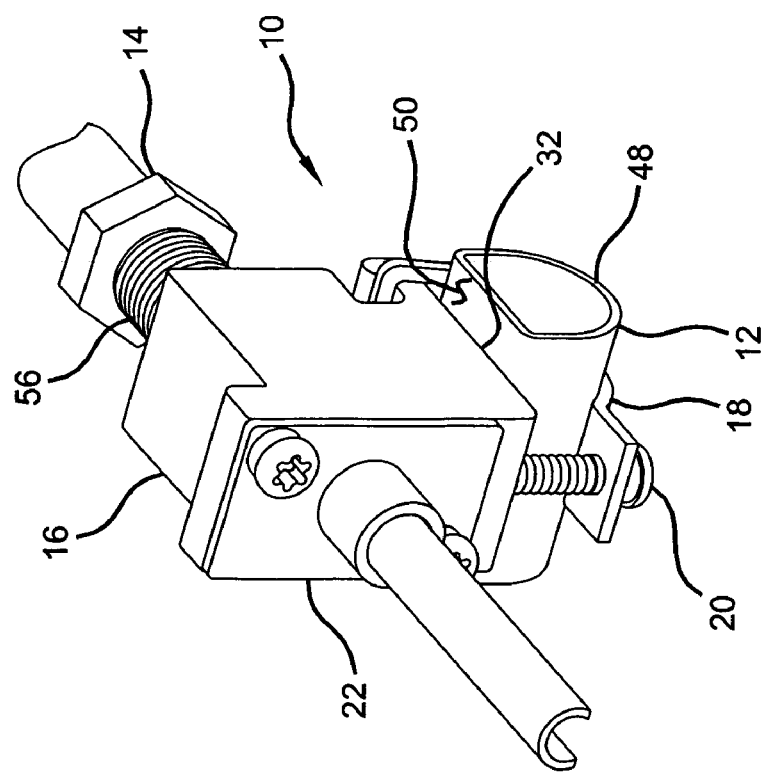
FIG 2
FIG 1

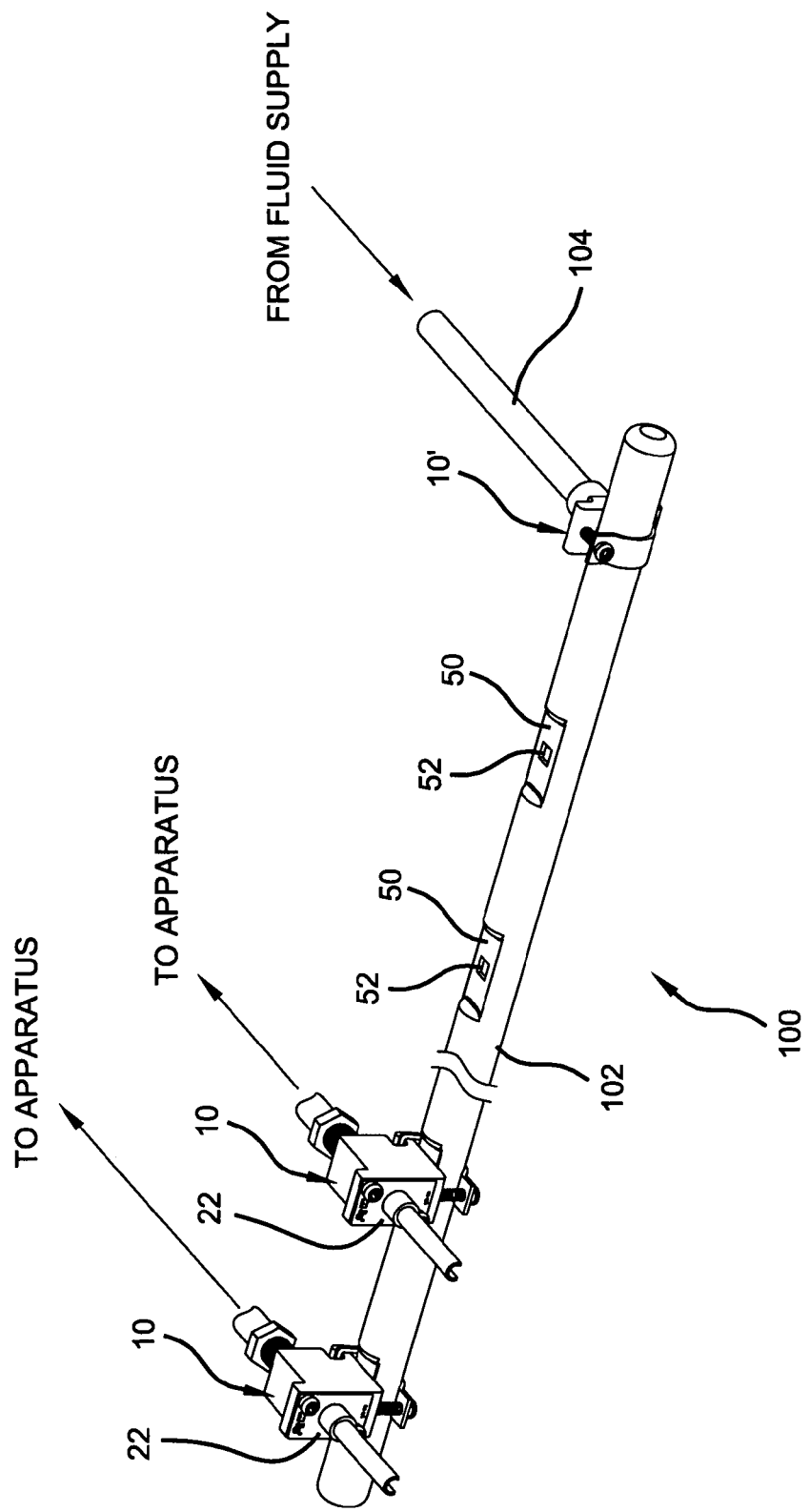

TUBING CONNECTING DEVICE

FIELD OF THE INVENTION

The present invention relates to tubing connecting systems, and more particularly to a metal tubing connecting system for gas fuel appliances.

BACKGROUND AND SUMMARY OF THE INVENTION

Gas fuel appliances include tubing connecting systems to enable fluid flow from a fluid source to an apparatus such as a burner. In some instances, the tubing connecting system connects first and second tubes for fluid communication. In other instances, the tubing connecting system is provided as a valve and includes a fluid regulating device to regulate fluid flow between first and second tubes.

In some saddle valve applications, the tubing connecting system can have an undesirable rocking movement between the tube and the fluid regulating device, usually as a result of an operator manipulating the fluid regulating device. While it may not be unsafe, movement of the tubing connecting system is undesired as it negatively impacts product appearance and a consumer's impression of quality.

Although there are known tubing connecting systems that are designed to obviate this problem, they retain certain disadvantages. For example, a bolt-through design includes a tube having parallel flats formed on opposite sides thereof. A coupling body rests on an upper flat and includes a port that is received a distance into the tube through an upper aperture. A fastener extends through the tube and is in threaded engagement with the coupling body. The fastener is tightened to secure the body to the tube to inhibit relative movement between the body and tube. Although this design inhibits relative movement between the body and tube, it requires additional components, manufacturing processes and assembly, all of which increase cost and manufacturing complexity.

The present invention concerns a tubing connecting system comprising a tube having a flat portion with an aperture therethrough and a coupling body having a planar surface surrounding a port and configured to engage the flat portion of the tube with the port in fluid communication with the aperture. A simple strap is affixed at both ends to the coupling body and is configured to engage the tube and hold the coupling body in place on the flat to provide a fluid seal therebetween.

In one feature, the strap includes a first aperture receiving a retention feature of the coupling body to secure the coupling body in place on the flat.

In another feature, the tubing connecting system further includes a fastener that is received through a second aperture of the strap. The fastener is operable to regulate an engagement force between the coupling body and the flat.

In another feature, the strap includes a single-piece, curved, rigid body.

In another feature, the tubing connecting system further includes a valve assembly for controlling fluid flow through the system.

In another feature, the tubing connecting system further includes an elastomeric seal that seals an interface between the planar surface and the flat.

In still other features, the port extends a distance into the tube through the aperture of the tube. The port includes a first profile that mates with a second profile of the aperture of the tube to inhibit relative rotation between the coupling body and the tube.

In yet another feature, the coupling body has a second having an exterior threaded surface.

Further features of the present invention will become apparent from the detailed description provided hereinafter. It should be understood that the detailed description and specific examples, while indicating the preferred embodiment of the invention, are intended for purposes of illustration only and are not intended to limit the scope of the invention as defined by the claims.

BRIEF DESCRIPTION OF THE DRAWINGS

The present invention will become more fully understood from the detailed description and the accompanying drawings, wherein:

FIG. 1 is a perspective view of a tubing connecting system according to the present invention including a valve assembly;

FIG. 2 is a cross-sectional view of the tubing connecting system of FIG. 1 without the valve assembly;

FIG. 10 is a perspective view of a portion of an exemplary fluid circuit including the tubing connecting systems of FIGS. 1 and 7.

DETAILED DESCRIPTION OF THE PREFERRED EMBODIMENTS

Figure 4:
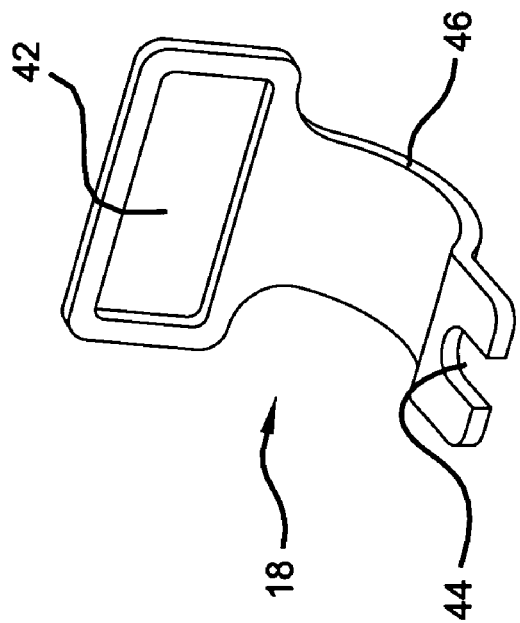
FIG. 4 is a perspective view of a bracket of the tubing connecting system.
Figure 3:
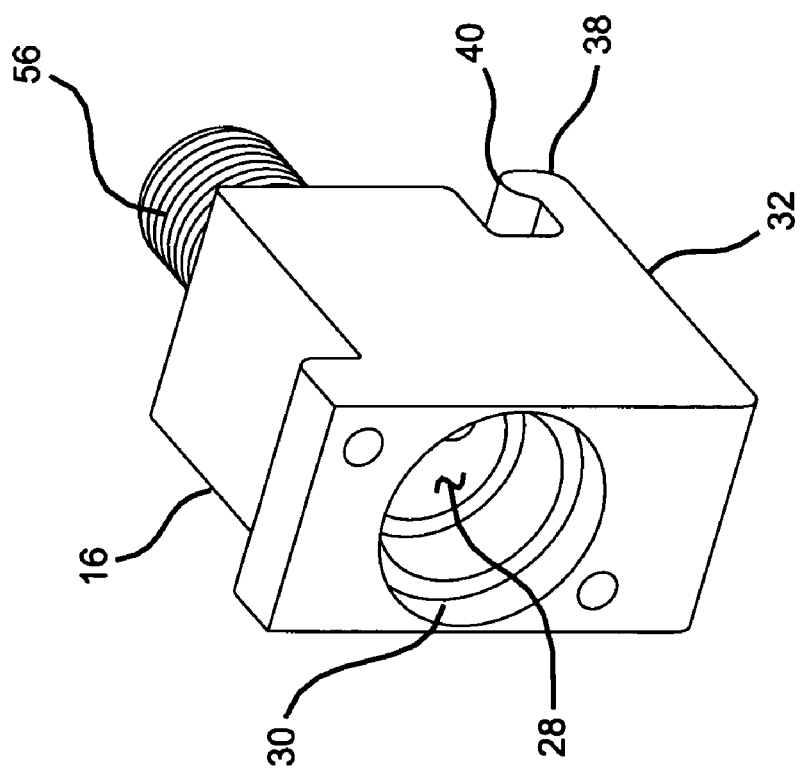
FIG. 3 is a perspective view of a coupling body of the tubing connecting system.

The following description of the preferred embodiments is merely exemplary in nature and is in no way intended to limit the invention, its application, or uses.

Referring now to FIGS. 1 through 4, a tubing connecting system 10 according to the present invention will be described in detail. The tubing connecting system 10 enables fluid transfer between a first tube 12 and a coupling 14 that modifies fluid flow to an apparatus such as a burner. The tubing connecting system 10 includes a coupling body 16, a bracket 18 and a fastener 20. The coupling body 16 is secured to the first tube 12 via a clamping force exerted by the bracket 18 and the fastener 20, as described in further detail below. The tubing connecting system 10 of FIG. 1 further includes valve components 22 that selectively enables fluid communication between the first tube 12 and the coupling 14. In this manner, the coupling body 16 functions as a valve body that operably supports the valve components 22.

The coupling body 16 includes a first port 24, a second port 26 and a fluid passage 28 enabling fluid communication between the first and second ports 24,26. The coupling body 16 further includes an opening 30 that receives the valve components 22. The valve components 22 can include any of several valve components known in the art and are operable to selectively control fluid flow between the first and second ports 24,26. The first port 24 is in fluid communication with the first tube 12 and the second port 26 is in fluid communication with the coupling 14. The coupling body 16 includes a flat 32 from which the first port 24 extends. The second port 26 extends from the coupling body 16 along an axis A that is generally perpendicular to an axis B of the first port 24. The coupling body 16 further includes a seal seat 34 formed in the flat 32 that carries a seal 36 therein and a retention feature 38 having a lip 40 formed at an end thereof.

The bracket 18 includes first and second apertures 42,44, respectively, formed at opposite ends of a contoured body 46. The contoured body 46 is formed to match the contour or contoured surface 48 of the first tube 12. In the case of the exemplary D-shaped profile, discussed in further detail below, the contoured body 46 is curved. The first aperture 42 and second aperture 44 enable the ends of the bracket 18 to be secured to the coupling body 16. It is anticipated that the second aperture 44 of the bracket 18 can be formed as a recess (see FIG. 4).

The first tube 12 includes the curved surface 48 and a flat 50 that define a generally D-shaped profile. It is anticipated that the flat 50 can be formed in a portion of the first tube 12 local to the tubing connecting system 10 (see FIG. 9). In this case, the remainder of the first tube 12 or areas that do not include a flat 50 formed therein would include a circular or otherwise rounded profile. The localized flats can be formed by inserting a D-shaped mandrel within the first tube 12 and stamping the flats 50 where desired. Alternatively, it is anticipated that the flat 50 can be formed along the entire length of the first tube 12. In this case, the D-shaped profile can be formed by stamping the first tube 12 with a D-shaped mandrel disposed therein or extruding or otherwise manufacturing the first tube 12 to include the D-shaped profile.

Although the first tube 14 is described as having a D-shaped profile, it is anticipated that the first tube 14 can have a range of geometrical profiles that include the flat 50. More specifically, it is anticipated that profile of the first tube 14 can include, but is not limited to, a square profile, a rectangular profile and a triangular profile. Regardless of the specific profile, at least one edge of the profile includes the flat 50.

Upon assembly, the first tube 12 is sandwiched between the coupling body 16 and the bracket 18. More specifically, the coupling body 16 is assembled onto the first tube 12, whereby the flat 32 abuts the flat 50 of the first tube 12 and the first port 24 is received through an aperture 52 formed through the flat 50 of the first tube 12. The retention feature 38 is received through the first aperture 42 and the bracket 18 is wrapped around the first tube 12, such that the contour of the bracket 18 aligns with the contour of the first tube 12. The threaded fastener 20 is received through the second aperture 44 and engages a threaded aperture 54 formed in the flat 32 of the coupling body 16. The threaded fastener 20 is tightened to induce a clamping force that urges the flat 32 of the coupling body 16 against the flat 50 of the first tube 12. The lip 40 inhibits the bracket 18 from sliding off of the retention feature 38 as the fastener 20 is tightened. The seal 36 is compressed between the seal seat 34 and the flat 50 to inhibit leaking of a fluid flowing between the first tube 12 and the tubing connecting system 10.

The coupling 14 can be coupled to the second port 26 in various manners known in the art. In one example, as illustrated in the Figures, the second port 26 includes a threaded outer surface 56. The coupling 14 can include a threaded inner surface (not shown) for threaded engagement with the threaded outer surface 56. It is anticipated that a seal or gasket means is disposed between the second port 26 and the coupling 14 to inhibit fluid leakage. It is anticipated that other means can be used to secure the coupling 14 to the second port 26 including, but not limited to, crimping and rolling.

Figure 6:
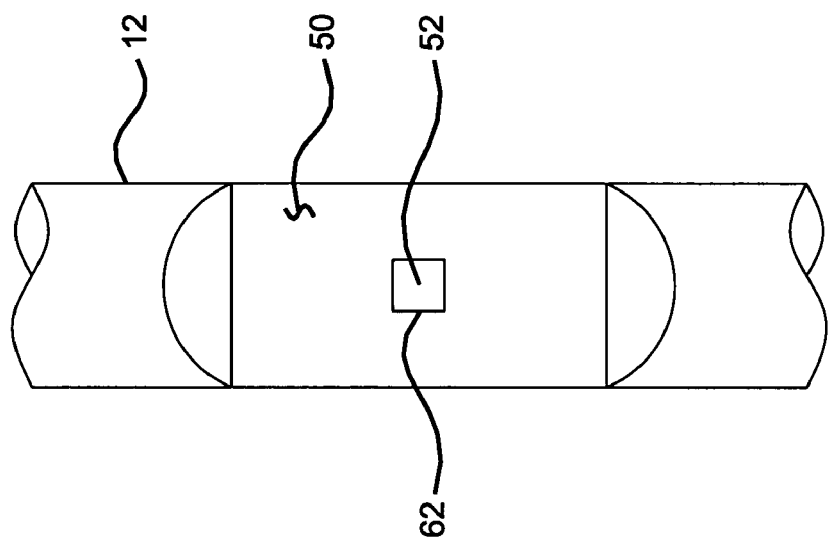
FIG. 6 is a plan view of a flat of a first tube illustrating an exemplary profile of an aperture that corresponds to the exemplary profile of the first port of FIG. 5.
Figure 5:
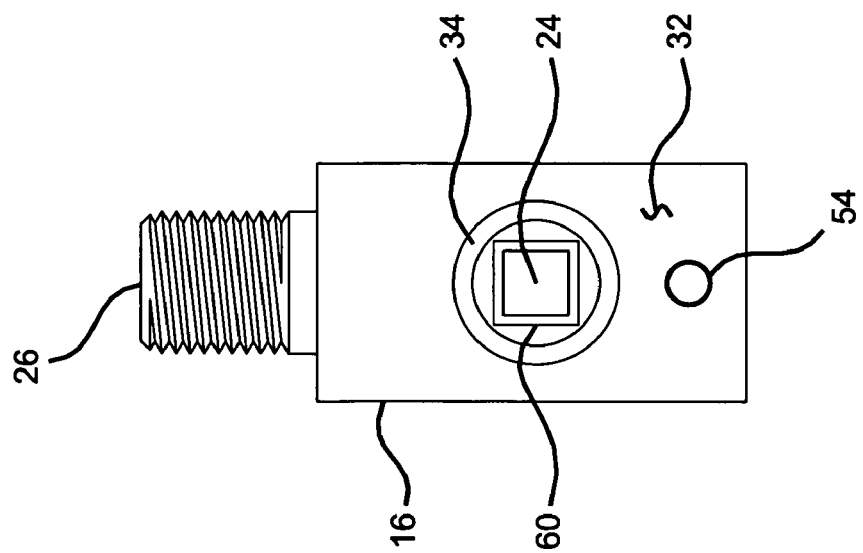
FIG. 5 is a plan view of a flat of the coupling body illustrating an exemplary profile of a first port.

With particular reference to FIGS. 5 and 6, it is anticipated that the first port 24 includes a profile that mates with a corresponding profile of the aperture 52. The interface between the profiles inhibits rotation of the coupling body 16 on the first tube 12 about the axis B. In the exemplary embodiment, the first port 24 include a square profile that includes at least one straight perimeter edge 60. The aperture 52 of the first tube 12 includes a corresponding square profile including at least one straight perimeter edge 62. Upon assembly, the straight edges 60,62 are aligned as the first port 24 is received through the aperture 52. In this manner, the interface between the straight edges 60,62 inhibits rotation of the coupling body 16 on the first tube 12 about the axis B. It is appreciated that the profiles of the first port 24 and the aperture can include one of multiple geometrical profiles including, but not limited to, square, rectangle, triangle, D-shaped, star-shaped, clover shaped and the like.

Figure 8:
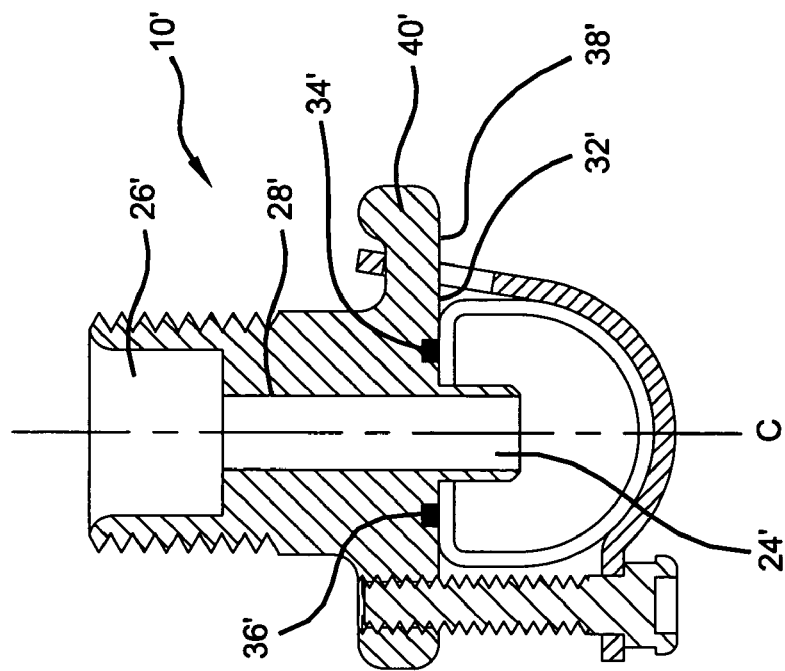
FIG. 8 is a cross-sectional view of the tubing connecting system of FIG. 7.
Figure 7:
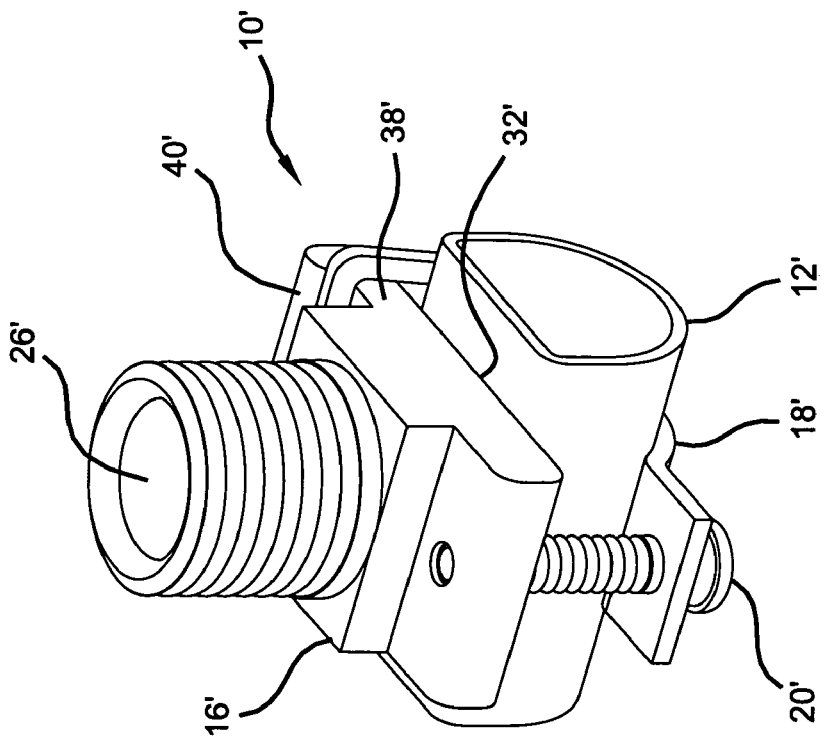
FIG. 7 is a perspective view of an alternative tubing connecting system according to the present invention.

Referring now to FIGS. 7 and 8, an alternative tube connecting system 10' according to the present invention will be described in detail. The alternative tubing connecting system 10' enables fluid transfer between a first tube 12' and a second tube (not shown). The tubing connecting system 10' includes a coupling body 16', a bracket 18' and a fastener 20'. The coupling body 16' is secured to the first tube 12' via a clamping force exerted by the bracket 18' and the fastener 20', as described in further detail below. The tubing connecting system 10' provides uninhibited fluid communication between the first tube 12' and the second tube.

The coupling body 16' includes a first port 24', a second port 26' and a fluid passage 28' enabling fluid communication between the first and second ports 24',26'. The first port 24' is in fluid communication with the first tube 12' and the second port 26' is in fluid communication with the second tube 14'. The coupling body 16' includes a flat 32' from which the first port 24' extends. The first and second ports 24',26' extend from the coupling body 16' along a common axis C. It is anticipated, however, that the second port 26' can extend from the coupling body 16' along an alternative axis that intersects the axis C. The coupling body 16' further includes a seal seat 34' formed in the flat that carries a seal 36' therein and a retention feature 38' having a lip 40' formed at an end thereof.

The bracket 18' and the first tube 12' are formed as similarly described above with respect to the bracket 18 and the first tube 12. The second tube can be coupled to the second port 26' as similarly described above with respect to the second port 26 and the second tube 14. Further, assembly of the tubing connecting system 10' and the first tube 12' is achieved as similarly described above with respect to the tubing connecting system 10 and the first tube 12.

Figure 9:
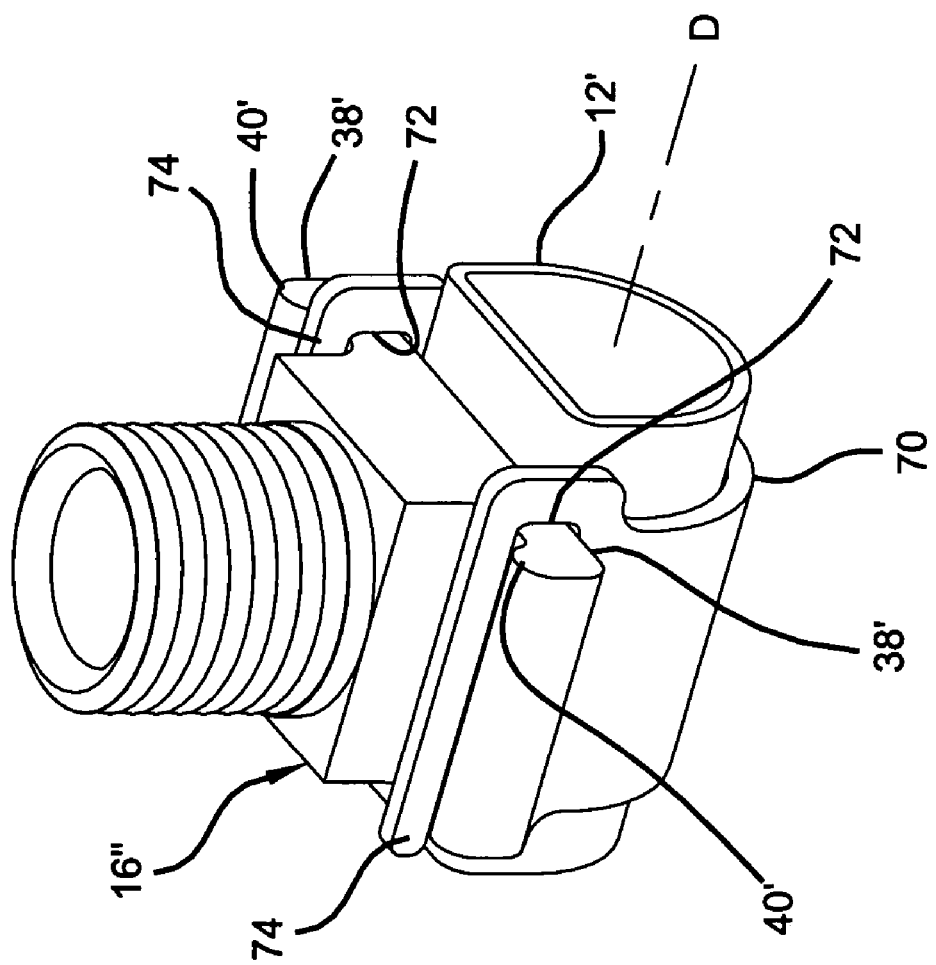
FIG. 9 is a perspective view of the tubing connecting system of FIG. 7 including an alternative bracket according to the present invention.

Referring now to FIG. 9, the tubing connecting system 10' is illustrated and is attached to the tube 12' using an alternative bracket 70. A coupling body 16'' of the tubing connecting system 10' includes retention features 38' extending from both sides. The retention features 38' each include a lip 40'. The bracket 70 includes slots 72 formed on opposite ends, and which define arms 74. The bracket 70 is slid into engagement with the coupling body 16" along an axis D of the tube 12'. More specifically, the retention features 38' are received into the slots 72 to inhibit detachment of the coupling body 16" from engagement with the tube 12'. The lips 40' inhibit the arms 74 from decoupling from the retention features 38'. Although the bracket 70 is illustrated in conjunction with the tubing connecting system 10', it is anticipated that the bracket 70 can be implemented with the tubing connecting system 10 with slight modification to the connecting body 16.

The tubing connecting systems 10,10' enable first and second tubes to be coupled for fluid communication and/or a first tube and an apparatus, such as a burner, for fluid communication. It is anticipated that the tubing connecting systems 10,10' can be implemented with various diameter tubes that can be provided as thin or thick walled tubes. It is further anticipated that the tubing connecting systems 10,10' can be implemented with any type of tubes regardless of their material or how they are formed. For example, the tubing connecting systems 10,10' can connect to extruded tubes, forged tubes and/or injection molded tubes.

Referring now to FIG. 10, a portion of an exemplary fluid circuit 100 is illustrated. It is anticipated that the fluid circuit 100 can be implemented in an appliance including, but not limited to, a gas range. The fluid circuit 100 includes a distributor tube 102 and a supply tube 104. The distributor tube 102 and the supply tube 104 are coupled for fluid communication by a tube connecting system 10', which is described in detail above. The distributor tube 102 includes a plurality of flats 50 formed therein including apertures 52. A plurality of tubing connecting systems 10 are secured to the distributor tube 102 at the flats 50. The tubing connecting systems 10 each include a valve assembly 22 to regulate fluid flow to an apparatus (e.g., gas burner) (not shown). Fluid (e.g., natural gas) flows from a fluid supply into the fluid circuit through the supply tube and is selectively distributed to a plurality of apparatuses through the tubing connecting systems 10.

The description of the invention is merely exemplary in nature and, thus, variations that do not depart from the gist of the invention are intended to be within the scope of the invention. Such variations are not to be regarded as a departure from the spirit and scope of the invention as defined in the claims.

What is claimed is:

1. A tubing connecting device for a fluid carrying tube having a flat portion with an aperture therethrough, comprising:
   a coupling body including a first port, a second port, and a fluid passageway providing fluid communication between said first and second ports;
   a valve assembly disposed within said fluid passageway that selectively enables fluid communication between said first and second ports;
   a planar surface on said coupling body, surrounding said first port and configured to engage said flat portion of said tube, said first port extending a distance into said tube through said aperture and having a first profile that mates with a second profile of said aperture to inhibit relative rotation between said coupling body and said tube; and
   a strap affixed at both ends to said coupling body and configured to engage said tube and hold said coupling body in place on said flat portion.

2. The tubing connecting device of claim 1 wherein said strap includes a first aperture, wherein said first aperture receives a retention feature of said coupling body to secure said coupling body in place on said flat.

3. The tubing connecting device of claim 2 further comprising a fastener that is received through a second aperture of said strap and that is operable to regulate an engagement force between said coupling body and said flat.

4. The tubing connecting device of claim 1 wherein said strap includes a contoured, rigid body.

5. The tubing connecting device of claim 1 further comprising an elastomeric seal that seals an interface between said planar surface and said flat.

6. The tubing connecting device of claim 1 wherein said second port includes an exterior threaded surface.

7. A tubing connecting system, comprising:
   a fluid carrying tube including a localized flat and a first aperture formed though said localized flat;
   a coupling body including a first port, a second port, and a fluid passageway providing fluid communication between said first and second ports;
   a valve assembly disposed within said fluid passageway that selectively enables fluid communication between said first and second ports;
   a planar surface on said coupling body, surrounding said first port and configured to engage said flat portion of said tube with said first port in fluid communication with said aperture;
   a strap affixed at both ends to said coupling body and configured to engage said tube and hold said coupling body in place on said localized flat, wherein said strap includes a first aperture that receives a retention feature of said coupling body to secure said coupling body in place on said localized flat; and
   a fastener that is received through a second aperture of said strap and that is operable to regulate an engagement force between said coupling body and said localized flat.

8. The tubing connecting system of claim 7 wherein said strap includes a contoured, rigid body.

9. The tubing connecting system of claim 7 further comprising an elastomeric seal that seals an interface between said planar surface and said localized flat.

10. The tubing connecting system of claim 7 wherein said first port extends a distance into said tube through said aperture of said tube.

11. The tubing connecting system of claim 10 wherein said first port includes a first profile that mates with a second profile of said aperture of said tube to inhibit relative rotation between said coupling body and said tube.

12. The tubing connecting system of claim 7 wherein said second port includes an exterior threaded surface.

13. A method of connecting a device to tubing, comprising:
   forming a localized flat on a tube;
   forming an aperture having a first profile through said localized flat;
   placing a coupling body on said localized flat, wherein a planar surface of said coupling body is adjacent to said localized flat and wherein a first port of said coupling body is in fluid communication with said aperture, said first port having a second profile;
   assembling a valve assembly into said coupling body to selectively enable fluid communication between said first port and a second port;
   aligning said first profile with said second profile to inhibit relative rotation between said coupling body and said tube;
   positioning a strap about said first tube; and securing ends of said strap to said coupling body to hold said coupling body in place on said localized flat.

14. The method of claim 13 further comprising receiving a retention feature of said coupling body through a first aperture of said strap to secure said coupling body to said flat.

15. The method of claim 14 further comprising:
receiving a fastener through a second aperture of said strap; and
manipulating said fastener to regulate an engagement force between said coupling body and said flat.

16. The method of claim 13 further comprising forming said strap as a contoured, rigid body.

17. The method of claim 13 further comprising providing an elastomeric seal to seals an interface between said planar surface and said flat.

18. The method of claim 13 wherein said first port extends a distance into said tube through an aperture of said tube.

19. A fluid circuit, comprising:
a first substantially cylindrical tube including a plurality of localized flat portions, each having a respective first aperture formed though said flat;
a second tube; and
a plurality of tubing connecting devices, each device comprising:
a coupling body including a first port, a second port, and a fluid passageway providing fluid communication between said first and second ports;
a planar surface on said coupling body, surrounding said first port and configured to engage said flat portion of said tube with said first port in fluid communication with said aperture; and
a strap affixed at both ends to said coupling body and configured to engage said first tube and hold said coupling body in place on one of said localized flat portions.

20. The fluid circuit of claim 19 wherein said strap includes a first aperture, wherein said first aperture receives a retention feature of said coupling body to secure said coupling body in place on said flat.

21. The fluid circuit of claim 20 further comprising a fastener that is received through a second aperture of said strap and that is operable to regulate an engagement force between said coupling body and said flat.

22. The fluid circuit of claim 19 wherein said strap includes a contoured, rigid body.

23. The fluid circuit of claim 19 further comprising a valve assembly disposed within said fluid passageway that selectively enables fluid communication between said first and second ports.

24. The fluid circuit of claim 19 further comprising an elastomeric seal that seals an interface between said planar surface and said flat.

25. The fluid circuit of claim 19 wherein said first port extends a distance into said tube through said aperture of said tube.

26. The fluid circuit of claim 25 wherein said first port includes a first profile that mates with a second profile of said aperture of said tube to inhibit relative rotation between said coupling body and said tube.

27. The fluid circuit of claim 19 wherein said second port includes an exterior threaded surface.

* * * * *

UNITED STATES PATENT AND TRADEMARK OFFICE
CERTIFICATE OF CORRECTION

PATENT NO. : 7,322,616 B2
APPLICATION NO. : 11/031713
DATED : January 29, 2008
INVENTOR(S) : Mark Thomas Lang It is certified that error appears in the above-identified patent and that said Letters Patent is hereby corrected as shown below:

Column 2, Line 4
After "second", should be --port--;

Column 6, Line 16, Claim 7
"though" should be --through--;

Column 7, Line 15, Claim 17
"seals" should be --seal--;

Column 7, Line 22, Claim 19
"though" should be --through--;

Signed and Sealed this

Thirteenth Day of May, 2008

JON W. DUDAS
*Director of the United States Patent and Trademark Office*